(12) United States Patent
Sorenson et al.

(10) Patent No.: US 9,715,869 B1
(45) Date of Patent: Jul. 25, 2017

(54) BANJO STAND FOR SEATED PLAYERS

(71) Applicants: Chris Sorenson, Ann Arbor, MI (US); Stephanie Sorenson, Ann Arbor, MI (US)

(72) Inventors: Chris Sorenson, Ann Arbor, MI (US); Stephanie Sorenson, Ann Arbor, MI (US)

( * ) Notice: Subject to any disclaimer, the term of this patent is extended or adjusted under 35 U.S.C. 154(b) by 0 days.

(21) Appl. No.: 15/338,403

(22) Filed: Oct. 30, 2016

(51) Int. Cl.
*G10G 5/00* (2006.01)
*F16M 11/28* (2006.01)

(52) U.S. Cl.
CPC ............ *G10G 5/005* (2013.01); *F16M 11/28* (2013.01)

(58) Field of Classification Search
CPC ........... G10G 5/00; G10G 5/005; F16M 11/28
USPC .................................................... 84/327, 329
See application file for complete search history.

(56) References Cited

U.S. PATENT DOCUMENTS

| | | | |
|---|---|---|---|
| 1,192,290 A | 7/1916 | Engstrom | |
| 1,261,841 A | 4/1918 | Mortenson | |
| 1,802,236 A | 4/1931 | Carroll | |
| 1,863,457 A | 6/1932 | Dudley | |
| 2,590,607 A | 3/1952 | Grimball | |
| 2,814,229 A | 11/1957 | Adelaide | |
| 3,497,293 A | 2/1970 | Hill | |
| 4,630,763 A | 12/1986 | Friedman | |
| 4,809,725 A | 3/1989 | Champigny | |
| 4,966,062 A | 10/1990 | Driggers | |
| 5,139,040 A | 8/1992 | Kelly | |
| 5,202,527 A * | 4/1993 | Gracie | F16M 11/28 84/327 |
| 6,693,234 B2 * | 2/2004 | Smith | G10G 5/005 84/327 |
| 7,594,696 B2 | 9/2009 | Girard | |
| 8,403,408 B2 | 3/2013 | Hosler | |
| 8,536,432 B1 * | 9/2013 | Herring | G10G 5/00 84/327 |

* cited by examiner

*Primary Examiner* — Kimberly Lockett
(74) *Attorney, Agent, or Firm* — John G. Posa; Belzer PC

(57) ABSTRACT

A stand adapted for placement between the legs of a player while in a sitting position supports the weight of a standard 5-string resonator banjo or banjo of similar head radius. A locking telescopic design with an instrument cradle allows the player to adjust the height to accommodate a comfortable playing position. The stand removes all of the weight of the banjo from the back, shoulders and legs of the player and allows for a more comfortable practice or playing session.

9 Claims, 2 Drawing Sheets

BANJO STAND FOR SEATED PLAYERS

FIELD OF THE INVENTION

This invention relates generally to musical instruments and, in particular, to a banjo stand for seated players.

BACKGROUND OF THE INVENTION

Those who do not play the instrument may be surprised to learn that banjos are quite heavy. Higher quality banjos are made of mahogany or maple, and use planetary gear sets and tone rings which help to amplify and put a 'ring' into the sound. However, a high-end, well equipped instrument can weigh 12 pounds or more.

Most banjos are supported by a single strap that passes over one shoulder of the musician while standing. The two ends of the strap are connected respectively to the top and bottom of the banjo resonator. As performances can last one or more hours, discomfort and fatigue may be significant, causing the banjo player to constantly shift the shoulder strap from one position to another.

U.S. Pat. No. 5,202,527 describes a stanchion including a saddle to which a guitar is fixedly mounted. The height and movement of the stanchion is adjustable in three axes to achieve a desired orientation, at which point the position of the guitar can be fixed, so that the performer only need be directly adjacent the stanchion to affect playing of the instrument. However, due to the unique character of the banjo, devices for supporting other types of instruments such as guitars—and for supporting other types of equipment in general—are of dubious relevance.

One solution to the problem is to sit while playing. To further alleviate the discomfort, various banjo knee rests have been devised. As one example, U.S. Pat. No. 1,261,841 relates to a banjo knee rest, the object of which is to provide means for supporting the banjo, while being played, more comfortably to the player than is possible where the lugs and bolts of the ordinary banjo rest directly upon the leg of the player. Another object is to provide a knee rest which can be easily applied to or detached from the banjo at the will of the user without interfering with packing the banjo in its case.

U.S. Pat. No. 1,802,236 relates to improvements in a banjo rest and has particular reference to means for correctly positioning the banjo upon the knee of the user and to further secure greater volume from the banjo. The principal object is to provide means whereby a simple attachment may be secured to the banjo in an inconspicuous manner while allowing the user to correctly position the instrument while playing it.

While seated playing enables the player to at least rest the instrument on one thigh or knee, after prolonged playing this, too, can become uncomfortable, even with existing knee rests. There is an outstanding need, therefore, for a banjo rest that can accommodate more of the weight of the instrument.

SUMMARY OF THE INVENTION

This invention improves the comfort of seated banjo players by providing a stand designed to support the weight of a standard 5-string resonator banjo or banjo of similar head radius. The stand rests between the legs of the player while in a sitting position. The stand features a locking telescopic design with an instrument cradle that allows the player to adjust the height to accommodate a comfortable playing position. The banjo does not lock into the stand, nor is it affixed in any way. This design allows for more free range of movement while in a sitting position.

In use, the player positions the stand in a comfortable position and rests the banjo in the cradle. This removes 100 percent of the weight of the banjo from the back, shoulders and legs of the player and allows for a more comfortable practice or playing session. The stand cradle is designed so the banjo will remain in the selected playing position. This is done via a "non-slip" padded cradle.

While other devices only distribute the weight of the banjo across the body or lock it in a single standing-position, the stand described herein alleviates all of the weight of the banjo by transferring it to the stand, thereby allowing for more free range of movement.

DETAILED DESCRIPTION OF THE INVENTION

Figures 1, 2:
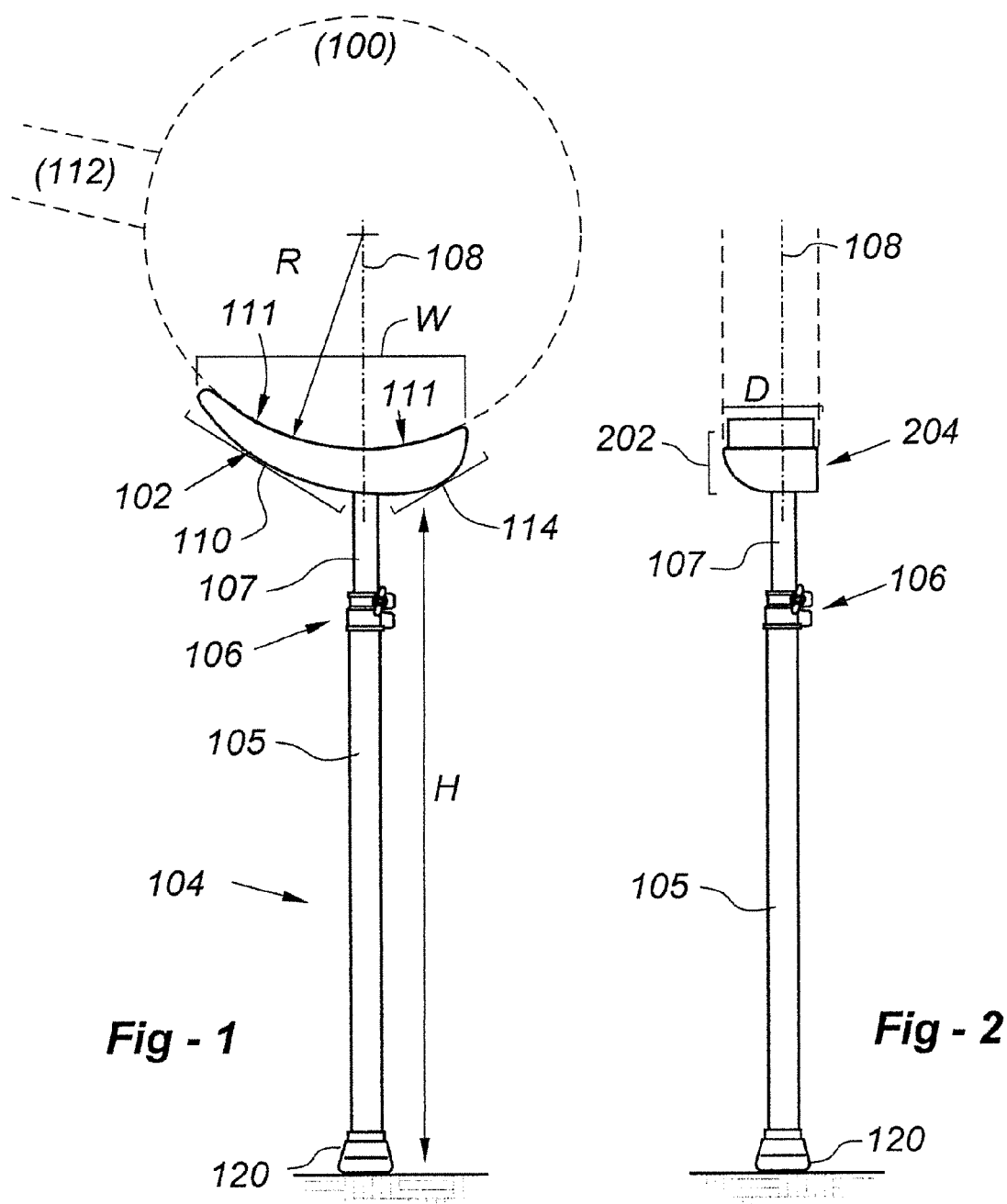
FIG. 1 is a front view of the preferred embodiment of the invention.
FIG. 2 is a side view of the preferred embodiment.
Figure 3:
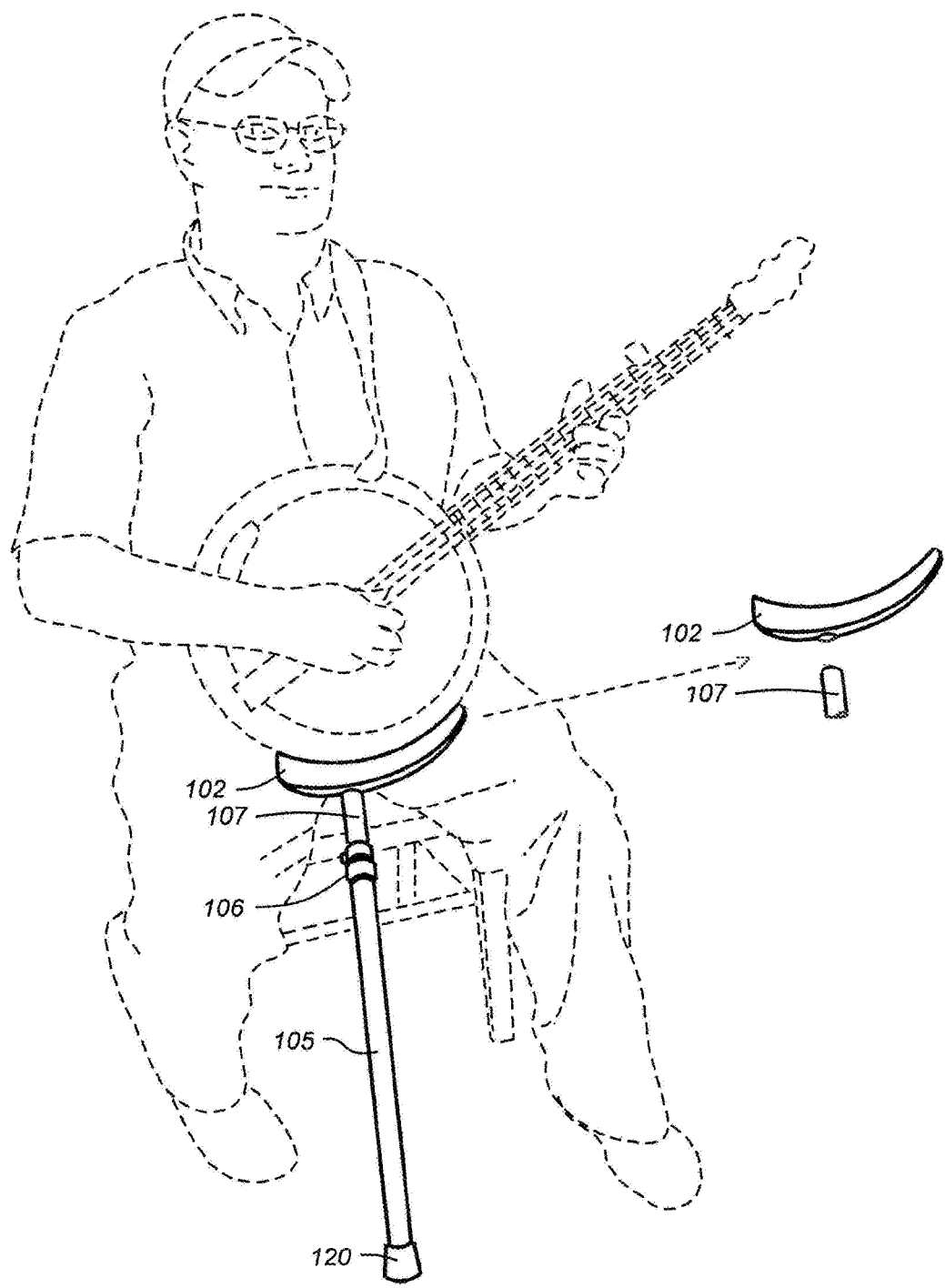
FIG. 3 is a drawing of the invention in use.

The accompanying Figures illustrate the preferred embodiment of the invention from different perspectives. The stand includes three primary components, namely, the banjo cradle 102, telescopic vertical support 104, and a height locking mechanism 106.

The banjo cradle 102 is specifically designed to hold a standard resonator style banjo (i.e., Gibson Mastertone). As such, the upper surface of the cradle has a radius on the order of 6 to 7.5 inches, more preferably in the range of 6.5 to 7 inches, and most preferably about or precisely 6.8 inches to accommodate a standard resonator banjo. The bottom of the saddle is also preferably curved as shown, though the radius need not be as precise as the upper surface and may be chosen for aesthetics.

The width of the cradle, W, is preferably in the range of 8 to 9 inches, more preferably about or precisely 8.5 inches in overall length. Note that the cradle is not positioned symmetrically with respect to the axis 108 of the vertical support 104. In particular, the cradle is longer from the axis at 110 toward the neck 112 of the banjo 100, and shorter at 114 away from the neck portion of the instrument. It was discovered that this offset arrangement provides for a more even support of the instrument as the neck assembly adds some weight.

The resonator of the banjo rests firmly on the cradle while in the playing position. The cradle is constructed of rigid material such as wood or hard plastic, and features a padded upper surface 111 to protect the instrument and to prevent the banjo from slipping out of the playing position. In the preferred embodiment the cradle is removably attached to the vertical support, enabling the cradle to be detached from the support for ease of storage or transportation. For example, the bottom of the cradle may have a hole to receive the top of the support or other attachment mechanism may be used.

The vertical support is preferably constructed from two piece of hollow tubing, each piece being about 18" in length. The inner diameter of the outer tube 105 conforms to the outer diameter of the inner tube 107 to facilitate smooth telescoping action. The preferred tubing material is aluminum though other metal and rigid plastics may be substituted. The outer diameter of the larger tube may be one inch or thereabouts, while the diameter of the inner tube may be 0.875", more or less. These dimensions are not critical so long as a rigid vertical support is provided.

Assuming each piece of tubing is roughly 18" in length, the support may be adjusted for a total telescopic length of nearly 36" while accounting for some degree of tubing overlap for stability. Stops may be built into the inside of the tubing to prevent the tubes from unintentionally separating. This adjustable height H in the drawing, from about 18 to 36", should accommodate all players in a seated position, including players who want the body of the instrument to be positioned well above the knees. The bottom end of the larger tube preferably includes a rubber bumper 120 to prevent marring of the floor and damage to the tube.

A locking mechanism 106 is attached to the larger of the telescopic tubes. This allows the user to easily change and lock the height of the stand. The locking mechanism features a friction hold design that firmly grasps the smaller tube at the selected height. Both twist-type and lever-type locking mechanisms may be used.

FIG. 2 is a side view of the inventive stand, showing that in the preferred embodiment the depth D of the cradle is preferably at least two inches, more preferably about 3 inches to cradle the instrument in a stable position. In the embodiment shown the back of the cradle is different from the front of the cradle. That is, the back includes a radius 202 for right-handed players to make the cradle lay more comfortably against the player's legs. The front portion 204, however, may be flat. In alternative embodiments, the front and back may be symmetrical about the axis 108 of the support so that the same apparatus can be used by both right- and left-handed players.

The invention claimed is:

1. A stand for a banjo played in a seated position, wherein the banjo has a circular resonator defining a plane and an outer surface with a diameter, the stand comprising:

a curved cradle having a bottom portion and an upper surface;

wherein the upper surface of the cradle has a continuous concave curve in the plane defined by the resonator, and wherein the curve has a radius corresponding to the diameter of the resonator;

an adjustable support having a lower end intended for ground contact and an upper end coupled to the bottom portion of the cradle;

the length of the support being adjustable from a length of 18 to 36 inches; and a locking mechanism for maintaining support at a desired length during use.

2. The stand of claim 1, wherein the radius of the cradle is from 6 to 7.5 inches.

3. The stand of claim 1, wherein the radius of the cradle is from 6.5 to 7 inches.

4. The stand of claim 1, wherein the radius of the cradle is substantially 6.8 inches.

5. The stand of claim 1, wherein the adjustable support comprises telescopic tubes.

6. The stand of claim 1, wherein:

the adjustable support defines a central lengthwise axis; and the curved cradle is offset relative to the axis to improve the weight distribution of the banjo.

7. The stand of claim 1, wherein the upper surface of the cradle is a non-slip surface.

8. The stand of claim 1, wherein the adjustable support is removably detachable from the cradle for transportation.

9. The stand of claim 1, wherein the lower end of the adjustable includes a resilient bumper.

* * * * *